United States Patent
Deppieri et al.

(10) Patent No.: US 9,361,503 B2
(45) Date of Patent: Jun. 7, 2016

(54) SYSTEMS, METHODS AND ARTICLES FOR READING HIGHLY BLURRED MACHINE-READABLE SYMBOLS

(71) Applicant: Datalogic IP Tech, S.r.l., Calderara di Reno (IT)

(72) Inventors: Francesco Deppieri, Mira (IT); Maurizio Aldo De Girolami, Calderara di Reno (IT); Alessandro Lanza, Sondrio (IT); Fiorella Sgallari, Zola Predosa (IT)

(73) Assignee: DATALOGIC IP TECH SRL, Bologna (IT)

(*) Notice: Subject to any disclaimer, the term of this patent is extended or adjusted under 35 U.S.C. 154(b) by 14 days.

(21) Appl. No.: 14/528,697

(22) Filed: Oct. 30, 2014

(65) Prior Publication Data

US 2016/0125218 A1    May 5, 2016

(51) Int. Cl.
*G06K 7/10*    (2006.01)
*G06K 7/14*    (2006.01)

(52) U.S. Cl.
CPC .................... *G06K 7/1473* (2013.01)

(58) Field of Classification Search
CPC .................................................. G06K 7/1473
See application file for complete search history.

(56) References Cited

U.S. PATENT DOCUMENTS

| | | |
|---|---|---|
| 5,120,940 A | 6/1992 | Willsie |
| 5,352,878 A | 10/1994 | Smith et al. |
| 5,401,949 A | 3/1995 | Ziemacki et al. |
| 5,504,318 A | 4/1996 | Joseph et al. |
| 5,943,170 A | 8/1999 | Inbar et al. |
| 6,708,884 B1 | 3/2004 | Su et al. |
| 7,128,270 B2 | 10/2006 | Silverbrook et al. |
| 7,181,066 B1 | 2/2007 | Wagman et al. |
| 7,260,266 B2 | 8/2007 | Nakajima et al. |

(Continued)

OTHER PUBLICATIONS

Bodnar et al. "Localization of Visual Codes in the DCT Domain Using Deep Rectifier Neural Networks". Presented on International Workshopon Artificial Neural Networks and Intelligent Information Processing—ANNIIP Sep. 1, 2014. p. 1-8.*

(Continued)

*Primary Examiner* — Thien M Le
*Assistant Examiner* — Asifa Habib
(74) *Attorney, Agent, or Firm* — Seed IP Law Group PLLC

(57) ABSTRACT

Systems and methods for robust recognition of machine-readable symbols from highly blurred or distorted images. An image signal representation of a machine-readable symbol element is transformed into a different space using one or more transform operations, which moves an n-dimensional vector of measured light intensities into another n-dimensional space. The types of transform operations may include blur robust orthonormal bases, such as the Discrete Sine Transform, the Discrete Cosine Transform, the Chebyshev Transform, and the Lagrange Transform. A trained classifier (e.g., an artificial intelligence machine learning algorithm) may be used to classify the transformed signal in the transformed space. The types of trainable classifiers that may be used include random forest classifiers, Mahalanobis classifiers, support vector machines, and classification or regression trees.

26 Claims, 5 Drawing Sheets

(56) References Cited

U.S. PATENT DOCUMENTS

| | | | |
|---|---|---|---|
| 7,451,931 | B2 | 11/2008 | Dant et al. |
| 7,558,709 | B2 | 7/2009 | Subbarao |
| 7,677,457 | B2 | 3/2010 | Madej |
| 7,766,241 | B2 | 8/2010 | Tomita |
| 8,322,620 | B2 | 12/2012 | Ye et al. |
| 8,385,971 | B2 | 2/2013 | Rhoads et al. |
| 8,505,823 | B2 | 8/2013 | Bhagwan et al. |
| 8,523,075 | B2 | 9/2013 | van der Merwe |
| 8,542,281 | B2 | 9/2013 | McGarry et al. |
| 2009/0092333 | A1 | 4/2009 | Hobson et al. |
| 2010/0187311 | A1 | 7/2010 | van der Merwe et al. |
| 2011/0068175 | A1 | 3/2011 | Powers et al. |
| 2011/0274361 | A1 | 11/2011 | Bovik et al. |
| 2012/0256001 | A1 | 10/2012 | Deppieri et al. |
| 2013/0161398 | A1 | 6/2013 | Silver |
| 2013/0223673 | A1 | 8/2013 | Davis et al. |
| 2013/0240628 | A1* | 9/2013 | van der Merwe .... G06K 7/1447 235/462.24 |

OTHER PUBLICATIONS

Jain et al., "Statistical Pattern Recognition: A Review," *IEEE Transactions on Pattern Analysis and Machine Intelligence* 22(1):4-36, Jan. 2000.

Mikolajczyk et al., "A Performance Evaluation of Local Descriptors," *IEEE Transactions on Pattern Analysis and Machine Intelligence* 27(10):1615-1630, Oct. 2005.

Wood, "Invariant Pattern Recognition: A Review," *Pattern Recognition* 29(1):1-17, 1996.

Dabbaghchian et al., "Feature Extraction Using Discrete Cosine Transform for Face Recognition," *Signal Processing and Its Applications ISSPA 9th International Symposium on IEEE*, 2007, 4 pages.

Extended European Search Report, dated Mar. 31, 2016, for EP Application No. 15192046.9-1901, 9 pages.

Imtiaz et al., "A DCT-based Local Feature Extraction Algorithm for Palm-print Recognition," *International Journal of Scientific & Technology Research* I(2):1-8, Mar. 2012.

* cited by examiner

SYSTEMS, METHODS AND ARTICLES FOR READING HIGHLY BLURRED MACHINE-READABLE SYMBOLS

BACKGROUND

1. Technical Field

The present disclosure relates to reading or decoding machine-readable symbols.

2. Description of the Related Art

Machine-readable symbols encode information in a form that can be optically read via a machine-readable symbol reader or scanner. Machine-readable symbols take a variety of forms, the most commonly recognized form being the linear or one-dimensional barcode symbol. Other forms include two-dimensional machine-readable symbols such as stacked code symbols, and area or matrix code symbols. These machine-readable symbols are typically made of patterns of high and low reflectance areas. For instance, a one-dimensional barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), International Article Number (EAN), Code 39, Code 128, Data Matrix, PDF417, etc.

Machine-readable symbols have widespread and varied applications. For example, machine-readable symbols can be used to identify a class of objects (e.g., merchandise) or unique objects (e.g., patents). As a result, machine-readable symbols are found on a wide variety of objects, such as retail goods, company assets, and documents, and help track production at manufacturing facilities and inventory at stores (e.g., by scanning objects as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a machine-readable symbol reader to allow the customer to redeem a coupon or to verify that the customer has purchased a ticket for the event.

Machine-readable symbol readers or scanners are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Machine-readable symbol readers may be fixed, for example, readers may be commonly found at supermarket checkout stands or other point of sale locations. Machine-readable symbol readers may also be handheld (e.g., handheld readers or even smartphones), or mobile (e.g., mounted on a vehicle such as a lift vehicle or a fork lift).

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Noise and blur can reduce the quality of an image depicting a machine-readable symbol. Generally, noise is variation in brightness or color of the pixels in an image and can be distributed according to a probability distribution (e.g., a uniform distribution, a Gaussian (normal) distribution, a Raleigh distribution, etc.). Noise can be concentrated in one or more color channels of an image or spread throughout an image. Examples of noise include graininess, color variation, and salt and pepper speckling. Blur may be a distortion of an image. An image can be blurred because, for example, the image capture device used to capture the image was out of focus, the image capture device moved while the image was being captured, the object including the machine-readable symbol moved while the image was being captured, the shutter-speed was too slow or too fast for the light conditions, the lens of the image capture device was dirty, etc. Using conventional techniques, decoding machine-readable symbols from highly blurred or distorted images can be difficult or impossible.

BRIEF SUMMARY

A method of operation for a processor-based device to identify a machine-readable symbol in an image, the processor-based device including at least one processor and at least one nontransitory processor-readable storage medium may be summarized as including: receiving, in the at least one nontransitory processor-readable storage medium, a plurality of training images, each training image corresponding to one of a plurality of machine-readable symbols; generating, by the at least one processor, a distortion model for the training images; generating, by the at least one processor, a plurality of distorted image signals based at least in part on the distortion model and the training images, each of the plurality of distorted image signals corresponding to one of the machine-readable symbols; transforming, by the at least one processor, the plurality of distorted image signals from a signal space into a first transform space; extracting, by the at least one processor, classification features from the transformed distorted image signals in the first transform space; and training, by the at least one processor, a first machine-readable symbol classifier based at least in part on the extracted classification features.

The method may further include: receiving a run-time image in the at least one nontransitory processor-readable storage medium; transforming, by the at least one processor, image signals of the received run-time image from a signal space into the first transform space; extracting, by the at least one processor, classification features from the transformed image signals in the first transform space; and classifying the run-time image using the trained first machine-readable symbol classifier using the extracted classification features. The method may further include: determining, by the at least one processor, a location of the received run-time image that includes a machine-readable symbol; and determining, by the at least one processor, a distortion effect of an object adjacent the location of the received run-time image that includes machine-readable symbol, wherein classifying the run-time image comprises accounting for the determined distortion effect. Determining a distortion effect of an object adjacent the location may include determining a distortion effect of at least one of: a machine-readable symbol element, a start pattern, or a stop pattern. Extracting classification features from the distorted image signals in the first transform space may include extracting a set of spectral coefficients. Transforming the plurality of distorted image signals from a signal space into a first transform space may include performing a discrete cosine transform (DCT) on the distorted image signals, and extracting classification features from the distorted image signals in the first transform space may include extracting a number of DCT coefficients obtained by performing the DCT on the distorted image signals. Generating a distortion model for the training images may include generating a distortion model that accounts for at least one of: optical blur, ink spread, quantization shift, luminance variation, or sensor noise. Transforming the plurality of distorted image signals from a signal space into a first transform space may include performing a transform that is robust to a low pass centrosymmetric filter. Performing a transform that is robust to a low pass centrosymmetric filter may include performing a Discrete Sine Transform, a Discrete Cosine Transform, a Chebyshev Transform, or a Lagrange Transform. Extracting classification features from the distorted image signals in the first transform space may include extracting a number of transform coefficients obtained by performing the transform on the distorted image signals. Training a first machine-readable symbol classifier based at least in part on the extracted classification features may include training at least one of a random forest classifier or a Mahalanobis classifier. Receiving a plurality of training images may include receiving a plurality of training images, each training image corresponding to a one-dimensional machine-readable symbol or a two-dimensional machine-readable symbol. The method may further include: determining, by the at least one processor, a quality measure for the first machine-readable symbol classifier; transforming, by the at least one processor, the plurality of distorted image signals from the signal space into a second transform space; extracting, by the at least one processor, classification features from the distorted image signals in the second transform space; training, by the at least one processor, a second machine-readable symbol classifier based at least in part on the extracted classification features; determining, by the at least one processor, a quality measure for the second machine-readable symbol classifier; and selecting one of the first machine-readable symbol classifier or the second machine-readable symbol classifier based at least in part on the determined quality measure. Determining a quality measure for the first and the second machine-readable symbol classifiers may include determining a measure of blur invariance for the first and the second machine-readable symbol classifiers.

A method for detecting a machine-readable symbol may be summarized as including: acquiring, by at least one processor, an electronic representation of a machine-readable symbol image in at least one nontransitory processor-readable storage medium; transforming, by the at least one processor, the electronic representation of the machine-readable symbol image from a signal space to a transform space; extracting, by the at least one processor, machine-readable symbol feature vectors from the transformed electronic representation of the machine-readable symbol image; and classifying, by the at least one processor, the machine-readable symbol image using a classifier trained in a supervised manner from a dataset of simulated degraded machine-readable symbol feature vectors with a known class.

An image processor system may be summarized as including: at least one processor; at least one nontransitory processor-readable storage medium operatively coupled to the at least one processor and storing at least one of data or instructions which, when executed by the at least one processor, cause the at least one processor to: receive a plurality of training images, each of the plurality of training images corresponds to one of a plurality of machine-readable symbols; generate a distortion model for the training images; generate a plurality of distorted image signals based at least in part on the distortion model and the training images, each of the plurality of distorted image signals corresponds to one of the machine-readable symbols; transform the plurality of distorted image signals from a signal space into a first transform space; extract classification features from the transformed distorted image signals in the first transform space; and train a first machine-readable symbol classifier based at least in part on the extracted classification features.

The at least one processor may: receive an run-time image in the at least one nontransitory processor-readable storage medium; transform image signals of the received run-time image from a signal space into the first transform space; extract classification features from the transformed image signals in the transform space; and classify the run-time image using the trained first machine-readable symbol classifier using the extracted classification features. The at least one processor may: determine a location of the received run-time image that includes a machine-readable symbol; and determine a distortion effect of an object adjacent the location of the received run-time image that includes machine-readable symbol, wherein the processor accounts for the determined distortion effect during classification of the received run-time image. The at least one processor may: determine the distortion effect of at least one of: a machine-readable symbol element, a start pattern, or a stop pattern. The at least one processor may: extract a set of spectral coefficients as the classification features. The at least one processor may: perform a discrete cosine transform (DCT) on the distorted image signals, and extract a number of DCT coefficients obtained by the performance of the DCT on the distorted image signals. The at least one processor may: generate a distortion model that accounts for at least one of: optical blur, ink spread, quantization shift, luminance variation, or sensor noise. The at least one processor may: perform a transform that is robust to a low pass centrosymmetric filter. The at least one processor may: perform a Discrete Sine Transform, a Discrete Cosine Transform, a Chebyshev Transform, or a Lagrange Transform. The at least one processor may: extract a number of transform coefficients obtained by performing the transform on the distorted image signals. The at least one processor may: train at least one of a random forest classifier or a Mahalanobis classifier. Each training image may correspond to a one-dimensional machine-readable symbol or a two-dimensional machine-readable symbol. The at least one processor may: determine a quality measure for the first machine-readable symbol classifier; transform the plurality of distorted image signals from a signal space into a second transform space; extract classification features from the distorted image signals in the second transform space; train a second machine-readable symbol classifier based at least in part on the extracted classification features; determine a quality measure for the second machine-readable symbol classifier; and select one of the first machine-readable symbol classifier or the second machine-readable symbol classifier based at least in part on the determined quality measure. The at least one processor may: determine a measure of blur invariance for the first and the second machine-readable symbol classifiers.

An image processor system may be summarized as including: at least one processor; at least one nontransitory processor-readable storage medium operatively coupled to the at least one processor and storing at least one of data or instructions which, when executed by the at least one processor, cause the at least one processor to: acquire an electronic representation of a machine-readable symbol image in the at least one nontransitory processor-readable storage medium; transform the electronic representation of the machine-readable symbol image from a signal space to a transform space; extract machine-readable symbol feature vectors from the transformed electronic representation of the machine-readable symbol image; and classify the machine-readable symbol image using a classifier trained in a supervised manner from a dataset of simulated degraded machine-readable symbol feature vectors with a known class.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
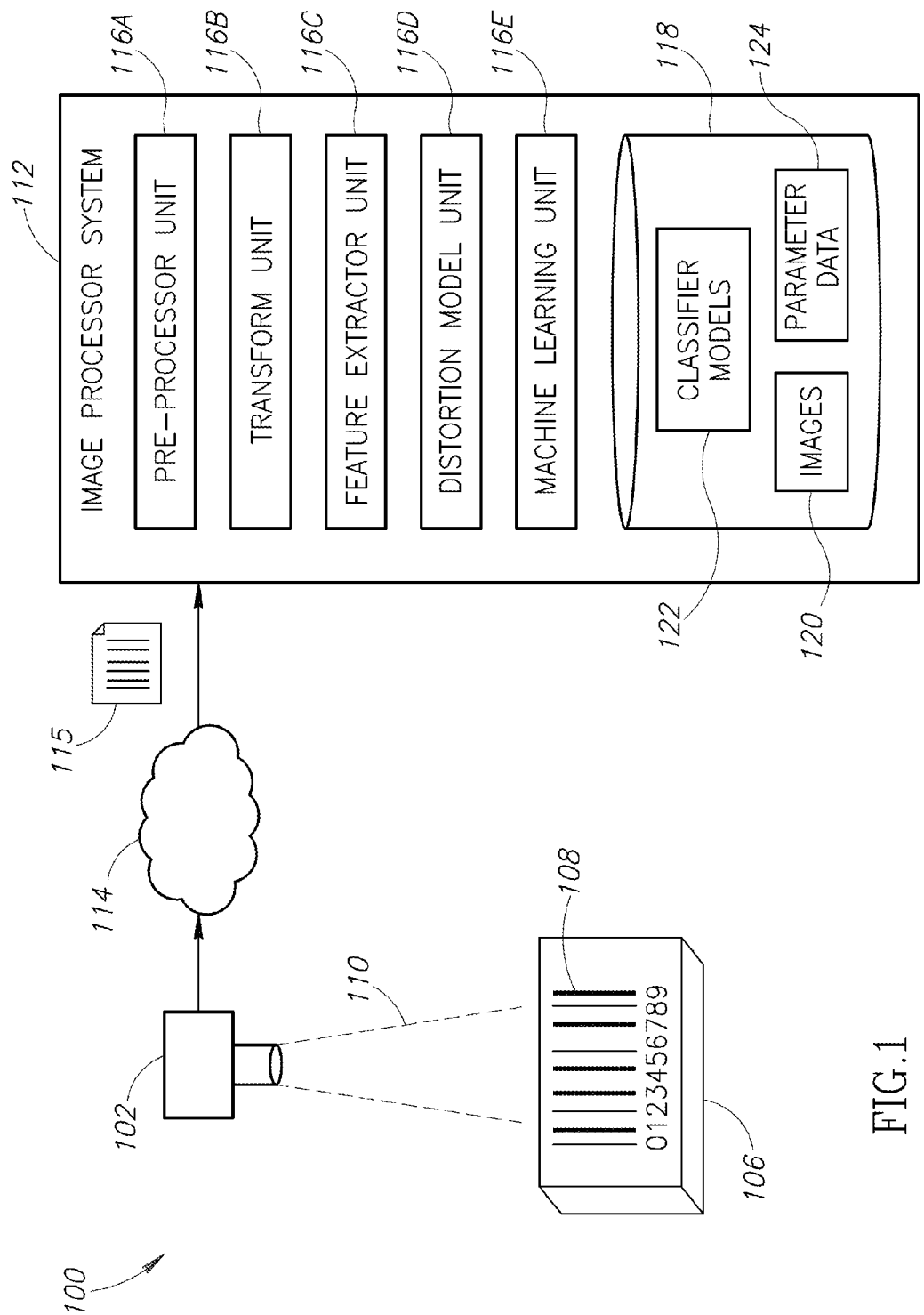
FIG. 1 is a schematic view of an environment in which a machine-readable symbol recognition system may operate, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the various embodiments have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

One or more implementations of the present disclosure provide robust recognition of machine-readable symbols from highly blurred or distorted images. In some implementations, an image signal representation of a machine-readable symbol element is transformed into a different space using one or more transform operations, which moves an n-dimensional vector of measured light intensities into another n-dimensional space. The types of transform operations may include, but are not limited to, blur robust orthonormal bases, such as the Discrete Sine Transform, the Discrete Cosine Transform, the Chebyshev Transform, and the Lagrange Transform. A trained classifier (e.g., an artificial intelligence machine learning algorithm) may be used to classify the transformed signal in the transformed space. The types of trainable classifiers that may be used include, but are not limited to, random forest classifiers and Mahalanobis classifiers.

One-dimensional machine-readable symbols (e.g., linear barcodes), such as those barcodes covered by the GS1 General Specification, encode individual numbers of a digit sequence using a linear sequence of parameterized elements or characters. As an example, the Universal Product Code (UPC) is a barcode symbology that is commonly used in many countries. Its most common form, the UPC-A, consists of 12 numerical digits, which are uniquely assigned to each trade item. Each UPC-A barcode consists of a scannable strip of black bars and white spaces, above a sequence of 12 numerical digits. The digits and bars maintain a one-to-one correspondence—in other words, there is only one way to represent each 12-digit number visually, and there is only one way to represent each visual barcode numerically. Each digit is represented by a unique pattern of two bars and two spaces. The bars and spaces are variable width—they may be one, two, three, or four modules wide. The total width for a digit is always seven modules. To represent the 12 digits of the UPC-A code requires 7×12=84 modules. A complete UPC-A includes 95 modules: the 84 modules for the digits combined with 11 modules for start, middle, and end patterns. The start and end patterns are three modules wide and use the pattern "bar-space-bar," each bar and space being one module wide. The middle pattern is five modules wide and uses the pattern "space-bar-space-bar-space," each bar and space being one module wide. In addition, a UPC symbol requires a quiet zone (additional space modules) before the start pattern and another quiet zone after the end pattern.

FIG. 1 illustrates an implementation depicting a machine-readable symbol recognition (MRSR) system 100, according to at least one embodiment. As discussed further below, the MRSR system 100 may be employed to automatically recognize or decode one or more machine-readable symbols in a blurred image of a target object. The MRSR system 100 described herein may be used at any suitable time, such as during a manufacturing process, a retail checkout process, etc.

In some implementations, the MRSR system 100 may include an image capture device 102, such as a camera or scanner. Appropriate interfaces or signals may be connected to and/or installed in the image capture device 102 so that the image capture device captures an image of a target object. In the illustrated embodiment, a target object 106 is shown having a machine-readable symbol 108 (e.g., a barcode) printed or otherwise inscribed thereon during a manufacturing process. The target object 106 may pass within a field of view (FOV) 110 of the image capture device 102 during an image capture or reading process. As such, the image capture device 102 acquires at least one image of machine-readable symbol 108 positioned on the target object 106.

In some implementations, the image capture device 102 may be operatively coupled to an image processor system 112 through a network 114 (e.g., LAN, WAN, Internet, extranet, intranet). The image processor system 112 receives digital images 115 from the image capture device 102. In some embodiments, the image capture device 102 may be communicatively connected directly to the image processor system 112 through a suitable connector (e.g., USB) or may be integrated with the image processor system (e.g., a handheld machine-readable symbol reader).

The image processor system 112 includes a number of sets of instructions and/or data 116 or modules that may be used to perform the functionality disclosed herein. Each of these sets of instructions and/or data 116 may be implemented as separate or combined sub-processes or applications executing on the image processor system 112 and stored by one or more nontransitory computer- or processor-readable media. In some implementations, fewer or more sets of instructions and/or data 116 may be provided. In the illustrated embodiment, the image processor system 112 includes a pre-processor unit 116A, a transform unit 116B, a feature extractor unit 116C, a distortion model unit 116D, and a machine learning unit 116E. Each of these sets of instructions and/or data 116 is discussed in detail below with reference to FIGS. 3-5. The image processor system 112 also includes a data store 118 which may store image data 120, classifier models 122, parameter data 124, or other instructions and/or data utilized in the machine-readable symbol recognition processes discussed below. The data store 118 may be integrated with the image processor system 112 or may be coupled to the image processor system via a suitable connection, such as a network.

The image processor system 112 may take the form of, or include, one or more server computer systems with associated nontransitory processor-readable storage media (e.g., the data store 118). The one or more server computer systems may be implemented in hardware and/or software. While illustrated as a single computer system and associated non-transitory storage media, many implementations may employ two or more computer systems and/or nontransitory associated processor- or computer-readable storage media. In some implementations or instances, the nontransitory processor- or computer-readable media may include a database or other data structure which stores one or more of: image data, model data, training data, test data, parameter data, element detection or recognition algorithms, and/or other data. In some implementations, the image processor system 112 may include or comprise a machine-readable symbol reader (e.g., a handheld reader, a fixed reader, or a mobile reader).

While generally described below in terms of a user interface generated via instructions executing on a computing device, in some implementations the image processor system 112 may serve as a user portal that may operate, for example, as a Web server, serving HTML pages or providing Web services which function as the user interface. Thus, in some implementations, the image processor system 112 serves as a user portal, providing a user interface, for instance a Web based interface, which allows users access functionality disclosed herein via various other processor-based computing devices.

While often illustrated as a single nontransitory processor-readable storage medium, in many implementations each of the various illustrated nontransitory computer- or processor-readable storage media may constitute a plurality of nontransitory storage media. The plurality of nontransitory storage media may be commonly located at a common location, or distributed at a variety of remote locations. Database(s) may be stored separately from one another on separate computer- or processor-readable storage media or may be stored on the same computer- or processor-readable storage medium as one another. Various computer- or processor-readable storage media may be co-located with the corresponding computer systems, for example, in the same room, building or facility. Alternatively, various computer- or processor-readable storage media may be located remotely from the corresponding computer systems (e.g., server computer systems) for example, in a different facility, city, state or country. Electronic or digital information, files or records or other collections of information may be stored at specific locations in non-transitory computer- or processor-readable media, thus are logically addressable portions of such media, which may or may not be contiguous.

Figure 2:
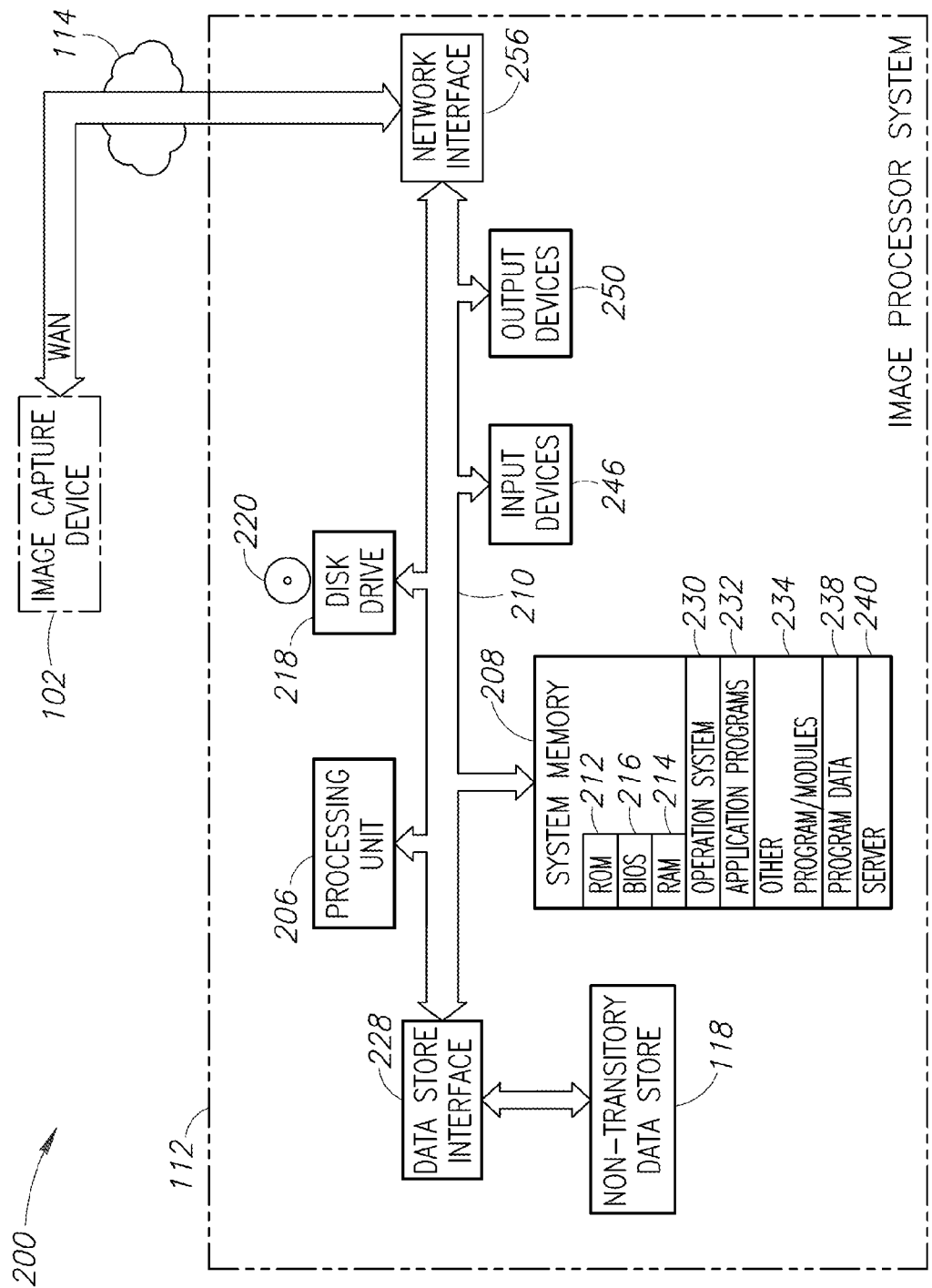
FIG. 2 is a functional block diagram of an image processor system of the machine-readable symbol recognition system of FIG. 1, according to at least one illustrated embodiment.

FIG. 2 and the following discussion provide a brief, general description of the components forming the MRSR system 100 including the image processor system 112 and the image capture device 102 in which the various illustrated embodiments can be implemented. The MRSR system 100 may, for example, implement the various functions and operations discussed immediately above in reference to FIG. 1. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices, for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The image processor system 112 may take the form of a PC, server, or other computing system executing logic or other machine executable instructions which may advantageously improve machine-readable symbol reading, allowing blurred and otherwise unreadable machine-readable symbols to be successfully read and decoded. The image processor system 112 includes one or more processors 206, a system memory 208 and a system bus 210 that couples various system components including the system memory 208 to the processor 206. The image processor system 112 will at times be referred to in the singular herein, but this is not intended to limit the embodiments to a single system, since in certain embodiments, there will be more than one image processor system 112 or other networked computing device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 206 may be any logic processing unit, such as one or more central processing units (CPUs), microprocessors, digital signal processors (DSPs), graphics processors (GPUs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures. The system memory 208 includes read-only memory ("ROM") 212 and random access memory ("RAM") 214. A basic input/output system ("BIOS") 216, which may be incorporated into at least a portion of the ROM 212, contains basic routines that help transfer information between elements within the image processor system 112, such as during start-up. Some embodiments may employ separate buses for data, instructions and power.

The image processor system 112 also may include one or more disk drives 218 for reading from and writing to one or more nontransitory computer- or processor-readable media 220 (e.g., hard disk, magnetic disk, optical disk). The disk drive 218 may communicate with the processor 206 via the system bus 210. The disk drive 218 may include interfaces or controllers (not shown) coupled between such drives and the system bus 210, as is known by those skilled in the art. The drives 218 and their associated nontransitory computer- or processor-readable media 220 provide nonvolatile storage of computer-readable instructions, data structures, program modules and other data for the image processor system 112. Those skilled in the relevant art will appreciate that other types of computer-readable media may be employed to store data accessible by a computer.

Program modules can be stored in the system memory 208, such as an operating system 230, one or more application programs 232, other programs or modules 234, and program data 238.

The application program(s) 232 may include logic capable of providing the machine-readable symbol recognition functionality described herein. For example, applications programs 232 may receive digital images 115 (FIG. 1) captured from the image capture device 102 or stored in a data store.

The system memory 208 may include communications programs 240 that permit the image processor system 112 to access and exchange data with other networked systems or components, such as the image capture device 102 and/or other computing devices.

While shown in FIG. 2 as being stored in the system memory 208, the operating system 230, application programs 232, other programs/modules 234, program data 238 and communications 240 can be stored on the nontransitory computer- or processor-readable media 220 or other nontransitory computer- or processor-readable media.

Personnel can enter commands (e.g., system maintenance, upgrades, etc.) and information (e.g., parameters, equations, models, etc.) into the image processor system 112 using one or more communicably coupled input devices 246 such as a touch screen or keyboard, a pointing device such as a mouse, and/or a push button. Other input devices can include a microphone, joystick, game pad, tablet, scanner, biometric scanning device, etc. These and other input devices may be connected to the processing unit 206 through an interface such as a universal serial bus ("USB") interface that couples to the system bus 210, although other interfaces such as a parallel port, a game port or a wireless interface or a serial port may be used. One or more output devices 250, such as a monitor or other display device, may be coupled to the system bus 210 via a video interface, such as a video adapter. In at least some instances, the input devices 246 and the output devices 250 may be located proximate the image processor system 112, for example when the system is installed at the system user's premises. In other instances, the input devices 246 and the output devices 250 may be located remote from the image processor system 112, for example when the system is installed on the premises of a service provider.

In some implementations, the image processor system 112 uses one or more of the logical connections to optionally communicate with one or more remote computers, servers and/or other devices via one or more communications channels, for example, one or more networks 114. These logical connections may facilitate any known method of permitting computers to communicate, such as through one or more LANs and/or WANs. Such networking environments are known in wired and wireless enterprise-wide computer networks, intranets, extranets, and the Internet.

In some implementations, a network port or interface 256, communicatively linked to the system bus 210, may be used for establishing and maintaining communications over the communications network 114. Further, a data store interface 252, which is communicatively linked to the system bus 210, may be used for establishing communications with the nontransitory processor-readable storage medium or data store 118, which may be a part of the image processor system 112 or at least in operative communication therewith. For example, the data store 118 may include a repository for storing information regarding parameters, models, image data, etc. In some embodiments, the data store interface 252 may communicate with the data store 118 via the networks 114.

In the MRSR system 100, program modules, application programs, or data, or portions thereof, can be stored in one or more computing systems. Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

For convenience, the processor 206, system memory 208, network port 256 and devices 246, 250 are illustrated as communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

Figure 3:
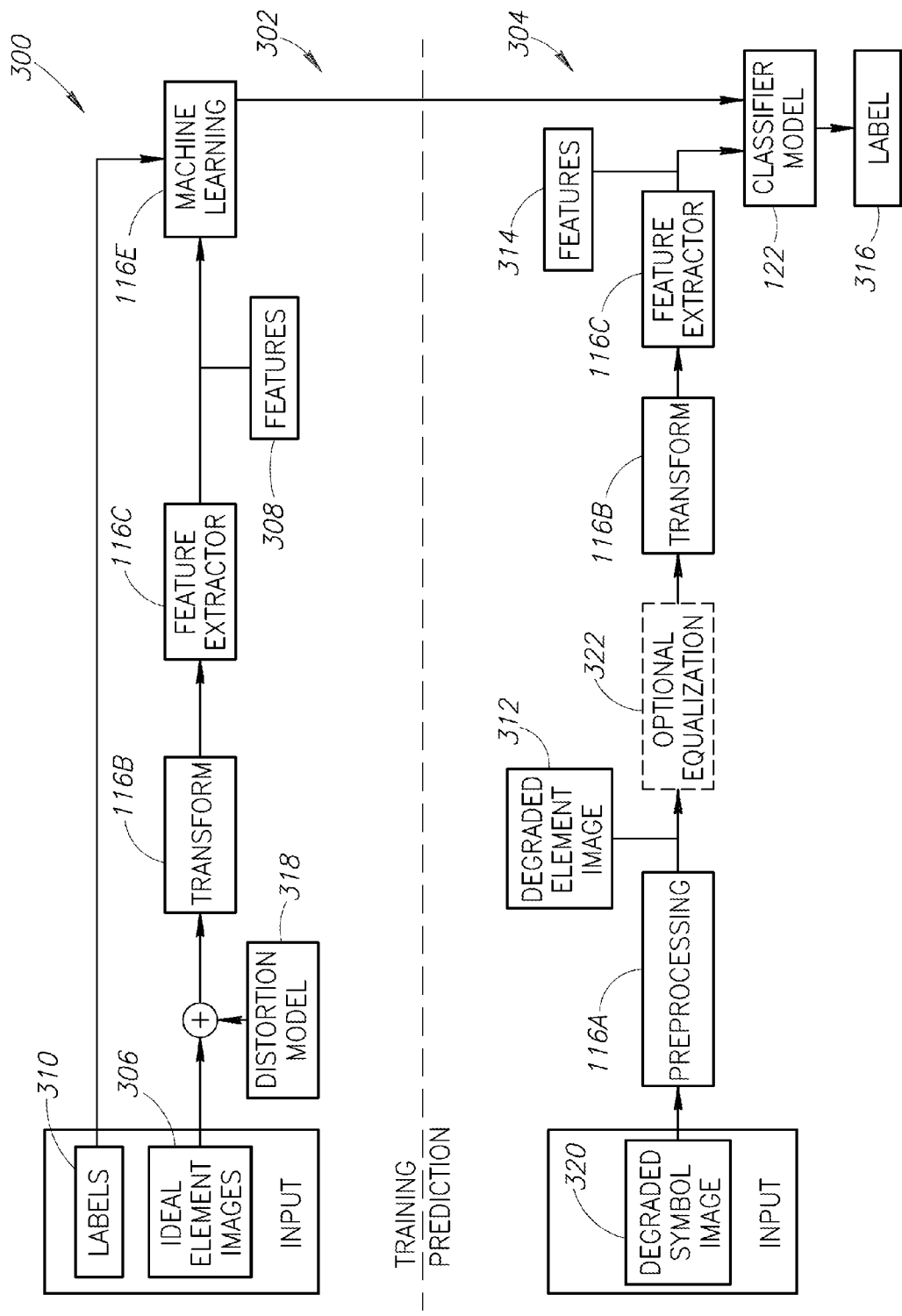
FIG. 3 is a block diagram showing a method of operation of a processor-based device in a machine-readable symbol recognition system to train a classifier model and to predict machine-readable symbol elements, according to at least one illustrated embodiment.

FIG. 3 shows a schematic block diagram of a supervised machine-readable symbol classification process 300 according to at least one implementation of the present disclosure. The process 300 may be implemented by one or more processor-based devices, such as the image processor system 112 of FIGS. 1 and 2. In some of the following discussion, reference is made to one-dimensional machine-readable symbols for explanatory purposes, but it should be appreciated that the present disclosure is applicable for use with machine-readable symbols having more than one dimension (e.g., two-dimensional machine-readable symbols).

The process 300 includes a learning or training phase 302 and a prediction phase 304. As a general overview, during the training phase 302 the feature extractor unit 116C (FIG. 1) converts input ideal symbology element images 306 (or characters) to a set of features 308. These features 308 capture information about each symbology element 306 and are used to classify the element. Pairs of feature sets 308 and labels 310 are fed into the machine learning unit 116E (FIG. 1) to generate the classifier model 122 (FIG. 1). During the prediction phase 304, the feature extractor unit 116C converts unseen symbology elements images 312 to sets of features 314. These features 314 are then fed into the classifier model 122 which generates predicted labels 316.

The ideal element images 306 may be digital or analog electronic representations of an element or character associated with one or more machine-readable symbologies. For example, in the case of a one-dimensional machine-readable symbol comprising vertical bars and spaces (e.g., UPC), each ideal element image 306 may be a one-dimensional electronic signal or vector that corresponds to image intensity values in a horizontal band cutting through an element. In this case, the ideal element image 306 may be represented as a one-dimensional image intensity profile generated by simulation or obtained from an image capture device.

As can be appreciated, an actual captured image of a machine-readable symbol may be degraded due to distortion or noise caused by various factors, such as printing defects, debris, optical system point spread function (PSF), quantization errors, noise in sensors, noise in electronics, etc. In the process 300, the distortion model unit 116D (FIG. 1) generates a distortion model 318 that is applied to the ideal element images 306 to generate simulated degraded image signals in the signal space that model noise and distortion of an image capturing and/or processing system, such as the image processor system 112 of FIGS. 1 and 2. The distortion model 318 is incorporated into the off-line training phase 302 used to train the classifier model 122 using supervised machine learning.

The process 300 utilizes the transform module or unit 116B (FIG. 1) to transform the simulated degraded image signals in the signal space into signals in a transform space. The transform unit 116B performs a transform that generates a transformed signal that has characteristic features that are substantially invariant (i.e., robust) to blur and other distorting effects. As used herein, blur invariance is defined as invariance to a low pass substantially centrosymmetric filter, in particular a Gaussian centrosymmetric filter. It has been determined that, even when edges of symbol elements are completely lost in an image or are displaced to such an extent that all of the relative widths are altered, the centroid of the blurred symbol elements does not translate within the signal. Thus, the transform operations performed by the transform unit 116B are operative to generate signals that are robust to blur and other distortion.

The transformed signal output from the transform unit 116B is fed to the feature extractor unit 116C, which extracts degraded simulated feature vectors 308 that are fed to the machine learning unit 116E to train the classifier model 112 in a supervised manner using the labels 310.

A purpose of the classifier model 112 is to map any input feature vector to one of the possible output classes corresponding with possible values (e.g., numerical) of the corresponding input machine-readable symbol digit. That is, the classifier model 122 applies a function to the input feature vector which maps it onto one of a number of potential classes. The function may be linear or non-linear. This operation may be repeated for each one of the N input feature vectors associated with N elements of one or more symbologies. For example, for classifying the input feature vectors into the integer digits 0 through 9, the classifier model 122 may map real valued vectors into one of 10 discrete classes.

During the prediction phase 304, an acquired degraded symbol image 320 (e.g., an image of a UPC code) may be pre-processed by the pre-processor unit 116A to generate a degraded element image 312. For example, the pre-processing unit 116A may identify the portion of the received degraded image signal 320 that corresponds to the machine-readable symbol (i.e., "localization"), and may subsequently identify within the machine-readable symbol signal sub-portions corresponding to individual elements (i.e., "synchronization"). The resulting degraded element image signal 312 may be optionally fed to an equalization unit 322 that performs some restoration of the image signal, and may allow for determination of significant points representing peaks, valleys or edges. In the case of a one-dimensional machine-readable symbol such as a barcode, pixel values in a horizontal band cutting through the vertical center of the barcode may be vertically integrated to generate a one-dimensional image intensity profile in the signal space.

Subsequent to pre-processing and optional equalization, the degraded signal space signal may be transformed into a signal in a transform space using the transform unit 116B. Then, the feature extractor unit 116C may extract a set of features 314 which are fed to the classifier model 122, which is operative to map the set of features to one of the possible classes or labels 316 corresponding to possible values (e.g., numerical) of the corresponding input machine-readable code element or character.

As discussed above, the machine learning in the training phase 302 is performed on the transformed signal rather than the signal in the signal space. The implementations of the present disclosure utilize a transform that, once combined with a distance based classifier, "separates" the population of blurred signals to allow the classifier to produce a significantly lower number of non-classifiable signals. In other words, it has been found that if classification is performed on feature vectors extracted from signals in the signal space, any feature vector chosen will not enable any known classifier to work properly when extremely blurred signals are present. However, by selecting a proper transform, the transformed signal is more blur robust and feature vector extraction results in a feature set that is also more blur robust. This allows the classifier model 122 to be applied successfully, producing much better separation of the populations corresponding to different elements or characters of a symbology.

There may not be a type of transform that a priori guarantees the best performance, so in some implementations of the present disclosure, multiple combinations of transforms and feature sets are tested. The family of transforms that best allows further separation by the classifier model 122 is a family of blur robust orthonormal bases, to which the Discrete Sine Transform, the Discrete Cosine Transform, the Chebyshev Transform, and the Lagrange Transform belong. In some instances, the Discrete Cosine Transform has proven to be the most effective transform.

The machine learning unit 116E (FIG. 1) and classifier model 122 may implement any known classifier algorithm, provided the algorithm is trainable in a supervised fashion using a representative training set of input feature vectors and known class labels. One example of an algorithm that may be used is the "random forest" algorithm, which is known in the literature.

As an alternative to the random forest algorithm, a Mahalanobis classifier or other classifier may be used. Some examples of suitable classifiers include, but are not limited to, support vector machines (SVM), classification and regression trees, and distance based classifiers.

Figure 4:
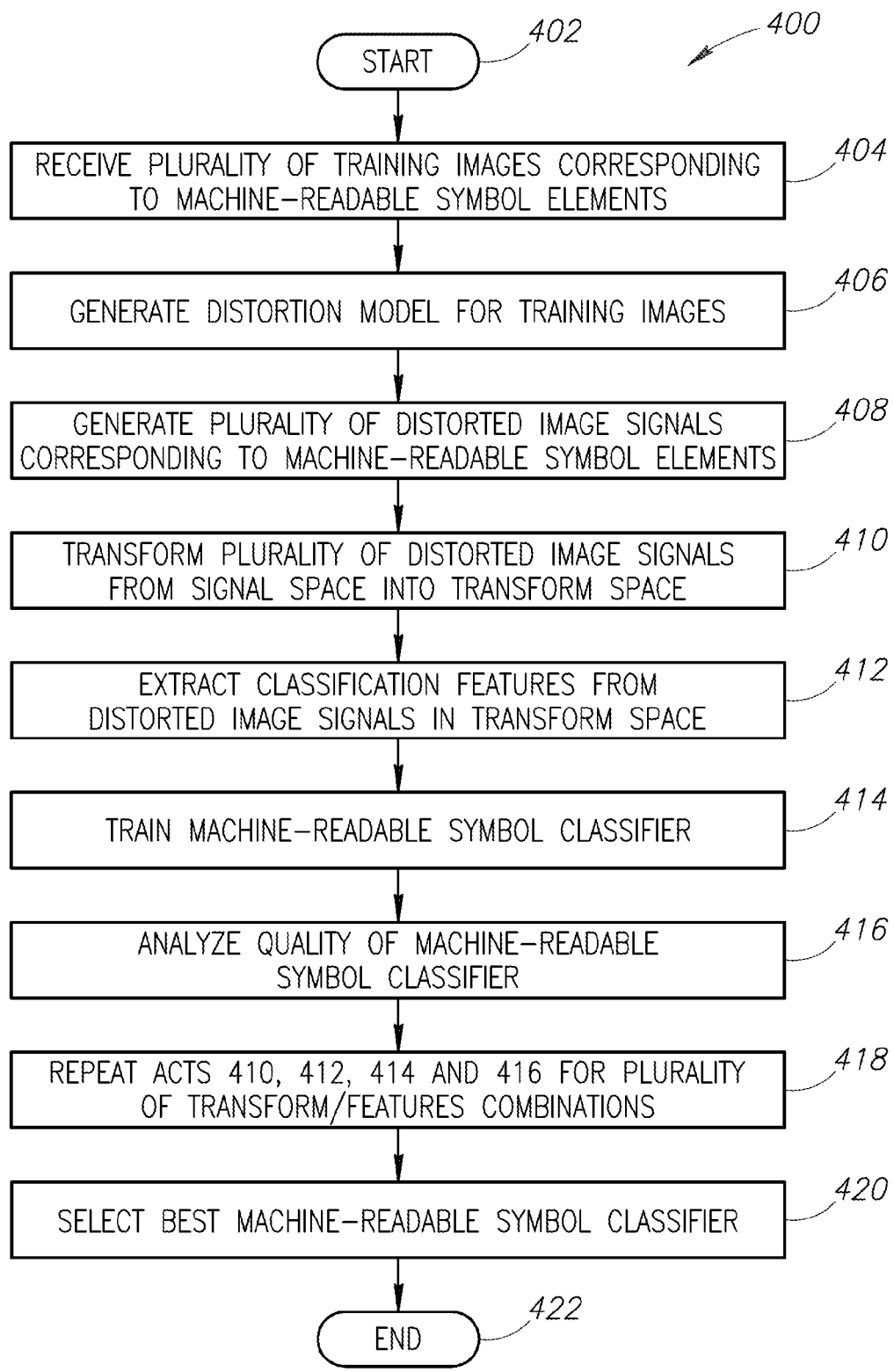
FIG. 4 is a flow diagram showing a method of operation of a processor-based device in a machine-readable symbol recognition system to train machine-readable symbol elements, according to at least one illustrated embodiment.

FIG. 4 shows a method 400 of operating a processor-based device to train a machine-readable symbol recognition system, according to one illustrated embodiment. Notably, the approach described herein provides machine-readable symbol recognition with a high degree of accuracy and performance in non-ideal conditions (e.g., acquired images are highly blurred).

The method 400 starts at 402. For example, the method 400 may start in response to an opening of a specific application or selection of an icon displayed on a display of a processor-based device, such as the image processor system 112 of FIGS. 1 and 2.

At 404, the processor-based device may receive one or more training images having examples of ideal elements of a symbology to be recognized. For example, the training images may be representations of elements of one-dimensional symbologies (e.g., UPC) or elements of two-dimensional symbologies. The training images may be received from an image capture device 102 or may be retrieved from a nontransitory processor-readable storage medium communicably coupled to the processor-based device. The training images may be simulated (e.g., one-dimensional digital signals representing image intensity profiles for each of the elements in a symbology).

At 406, the processor-based device may generate or define a distortion model to apply to the ideal training images. The distortion model may take into account numerous possible sources of noise, such as optical blur, ink spread, shift (quantization), luminance variation, sensor noise, electronics noise, etc. The distortion model may be specific to a particular image processor system or environment.

At 408, the processor-based device may utilize the distortion model and the training images to generate a plurality of distorted image signals, each of the distorted image signals corresponding to a particular element in a symbology (e.g., an alphanumeric character).

At 410, the processor-based device transforms the distorted image signals from the signal space into a transform space. At 412, the processor-based device extracts classification features from the distorted image signals in the transform space. For example, in the case wherein the processor-based device performs a Discrete Cosine Transform on the distorted image signals, the extracted features may include a number of coefficients of the cosine series decomposition (e.g., the first ten coefficients, the first five coefficients, coefficients 2-20).

At 414, the processor-based device may train a machine-readable symbol classifier model using the extracted features and the labels for the image data. As discussed above, the processor-based device may use any suitable machine learning algorithm to train the classifier model.

At 416, the processor-based device may analyze the quality of the machine-readable symbol classifier model. As discussed above, the processor-based device may check to determine if the resulting population is well separated, i.e., the statistics of the transformed population provide an effective classification with minimal occurrences of non-classifiable points.

At 418, the processor-based device may repeat acts 410, 412, 414 and 416 for a plurality of transform/feature combinations. For example, the processor-based device may perform transforms using one or more of the Discrete Sine Transform, the Discrete Cosine Transform, the Chebyshev Transform, and the Lagrange Transform, with varying numbers of extracted features (e.g., coefficients) for each type of transform.

At 420, the processor-based device selects the transform/feature combination that generates the most robust statistics (e.g., best classification of target space, low or no overlap of regions corresponding to different elements, lowest number of non-classifiable points).

The method 400 ends at 422 until started or invoked again. For example, the method 400 may be invoked to train a machine-readable symbol recognition system on a new or modified symbology. The method 400 may also be invoked anytime there are changes to an image processor system, such as the addition or modification of components, a changed environment, routine calibration events, etc.

Figure 5:
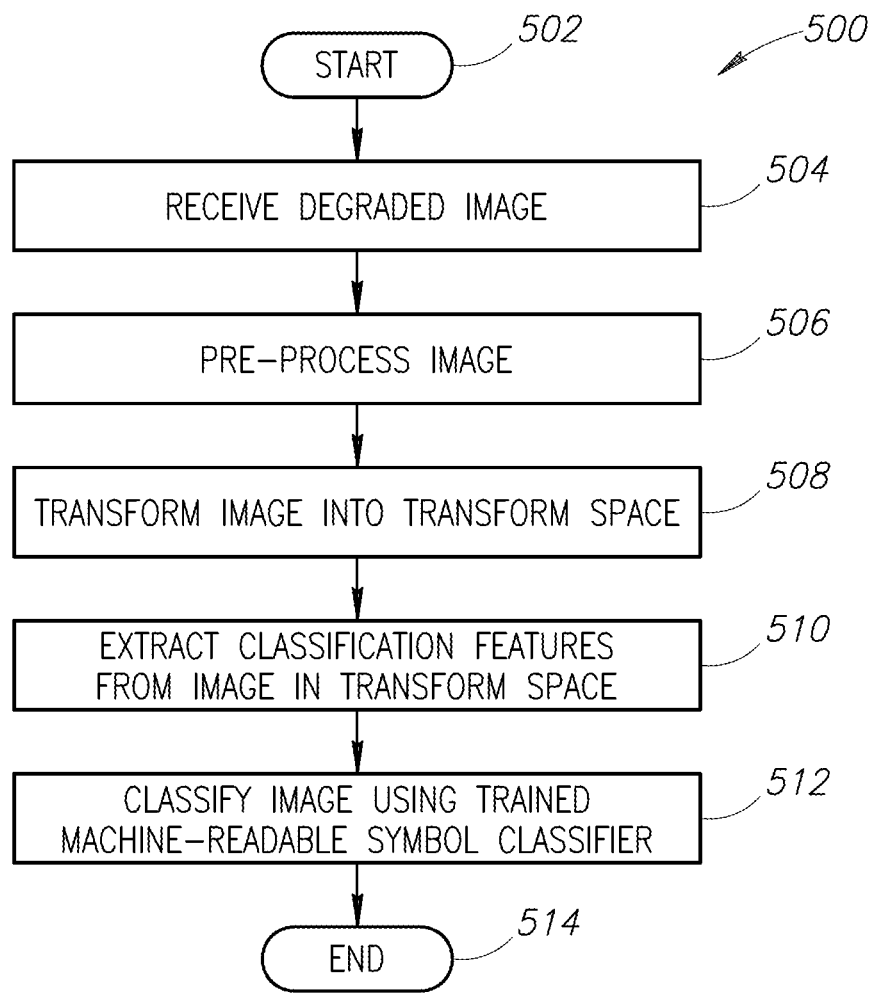
FIG. 5 is a flow diagram showing a method of operation of a processor-based device in a machine-readable symbol recognition system to classify machine-readable symbol elements, according to at least one illustrated embodiment.

FIG. 5 shows a method 500 of operating a processor-based device to perform machine-readable symbol recognition on a digital image. The method starts at 502, for example, when an image-processor system (e.g., a handheld machine-readable symbol reader) acquires an image using an image capture device.

At 504, the processor-based device receives a degraded image that includes a machine-readable symbol (e.g., a barcode). For example, the processor-based device may retrieve the degraded image from a nontransitory processor-readable storage medium communicably coupled to the processor-based device. The degraded image may be degraded or blurred due to distortion or noise caused by various factors, such as printing defects, optical system point spread function (PSF), quantization errors, noise in sensors, noise in electronics, etc.

At 506, the processor-based device pre-processes the degraded image. For example, the processor-based device may identify the portion of the received degraded image that corresponds to the machine-readable symbol (i.e., "localization"), and may identify within the machine-readable symbol sub-portions corresponding to individual symbology elements (i.e., "synchronization"). In the case of a one-dimensional machine-readable symbol such as a barcode, pixel values in a horizontal band cutting through the vertical center of the barcode may be vertically integrated to generate a one-dimensional image intensity profile in the signal space.

At 508, the processor-based device transforms the image from the signal space into the transform space utilized during the training phase 302 (FIG. 3). At 510, the processor-based device extracts classification features (e.g., N coefficients of a Discrete Cosine Transform) from the image in the transform space. At 512, the processor-based device classifies the image by feeding the extracted features to a trained machine-readable symbol classifier, such as the classifier model 122 of FIG. 3.

The method 500 ends at 514 until invoked again. For example, the method 500 may be repeated for each element of a machine-readable symbol captured in a digital image until all elements have been decoded.

In an ideal situation, the transform space is a Euclidean one, and each feature vector is characterized by a Euclidean distance from the "ideal" points (e.g., the points where undistorted symbols maps). In such a situation, the vector can be classified based on the nearest "ideal" point. However, in practice, the transformed points of distorted symbols belonging to one of the classes may lie in an ellipsoid and the best distance to be used for classification may not be Euclidean. Hence, in some implementations classifiers that use Mahalanobis distance are utilized.

If the Euclidean distance between the transformed point and the ideal point is not appropriate for classification, it may be more difficult to define an alternate distance measure because the volume enclosing the confidence zone may have convex and concave zones. In these cases, all confidence intervals for each coordinate are dependent on each other. Based on the kind of transform and based on the shape of the statistical distribution in transformed space, it should be possible to find a distance measure that is able to adequately separate the distributions.

In some implementations, in transform space there is one "ideal" point (and associated "ellipse") for each symbology element, so for a numerical symbology the number of targets is ten (i.e., digits 0-9). For alphanumeric symbologies, the number of targets is greater. In some implementations, a broader set of targets may be defined in transform space. For example, for a purely numerical symbology, a digit's previous neighbor may be added to each digit to generate additional targets. In this example, the number of targets would increase from 10 to 100 (each digit 0-9 may be preceded by any other digit 0-9).

In some implementations, the processor-based device may also model the effect that a preceding/following element (e.g., digit) has on a signal for an element under analysis. The distorting effect of an adjacent element on an ideal element may be additive, and may be treated as any other source of noise. Thus, when the simulated or synthetically generated set of signals to be used during the training phase 302 (FIG. 3) is generated, the distortion due to adjacent elements may be subtracted. This functionality reduces distortion of the statistical distribution in the transform space.

In practice, accounting for the distortion due to adjacent elements works most straightforwardly for preceding elements because preceding elements are likely to be already known from a previous classification attempt. To implement this functionality, the processor-based device may model the effect of a neighboring element on a particular element under analysis. When an element is analyzed, and it is not the first element in a sequence of elements, the distortion effect of the previous adjacent identified element is modeled. If the element is the first element in a sequence of elements, the distortion effect of the previous adjacent pattern (e.g., start, stop, middle) is modeled. The modeled previous element distortion is then subtracted from the element under analysis, which reduces distortion of the element, thereby making the element easier to classify. It should be appreciated that if the scan of the sensor line is performed in the reverse direction, the "next" element becomes the "previous" element, and vice versa.

In some implementations, the processor-based device takes into account distortion effects due to adjacent patterns (e.g., bars and spaces), rather than taking into account distortion effects due to adjacent elements. In this way, the number of possible combinations that could occur is reduced and may be symbology independent.

As discussed above, the implementations of the present disclosure are applicable to all one-dimensional and two-dimensional symbologies. Of course, implementing the disclosed functionality for two-dimensional symbologies may require greater computational power relative to implementations used for one-dimensional symbologies.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, and U.S. patent applications referred to in this specification and/or listed in the Application Data Sheet are incorporated herein by reference in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation for a processor-based device to identify a machine-readable symbol in an image, the processor-based device including at least one processor and at least one nontransitory processor-readable storage medium, the method comprising:

receiving, in the at least one nontransitory processor-readable storage medium, a plurality of training images, each training image corresponding to one of a plurality of machine-readable symbols;

generating, by the at least one processor, a distortion model for the training images;

generating, by the at least one processor, a plurality of distorted image signals based at least in part on the distortion model and the training images, each of the plurality of distorted image signals corresponding to one of the machine-readable symbols;

transforming, by the at least one processor, the plurality of distorted image signals from a signal space into a first transform space;

extracting, by the at least one processor, classification features from the transformed distorted image signals in the first transform space;

training, by the at least one processor, a first machine-readable symbol classifier based at least in part on the extracted classification features;

determining, by the at least one processor, a quality measure for the first machine-readable symbol classifier;

transforming, by the at least one processor, the plurality of distorted image signals from the signal space into a second transform space;

extracting, by the at least one processor, classification features from the distorted image signals in the second transform space;

training, by the at least one processor, a second machine-readable symbol classifier based at least in part on the extracted classification features;

determining, by the at least one processor, a quality measure for the second machine-readable symbol classifier; and selecting one of the first machine-readable symbol classifier or the second machine-readable symbol classifier based at least in part on the determined quality measure.

2. The method of claim 1, further comprising:

receiving a run-time image in the at least one nontransitory processor-readable storage medium;

transforming, by the at least one processor, image signals of the received run-time image from a signal space into the first transform space;

extracting, by the at least one processor, classification features from the transformed image signals in the first transform space; and classifying the run-time image using the trained first machine-readable symbol classifier using the extracted classification features.

3. The method of claim 2, further comprising:

determining, by the at least one processor, a location of the received run-time image that includes a machine-readable symbol; and determining, by the at least one processor, a distortion effect of an object adjacent the location of the received run-time image that includes machine-readable symbol, wherein classifying the run-time image comprises accounting for the determined distortion effect.

4. The method of claim 3 wherein determining a distortion effect of an object adjacent the location comprises determining a distortion effect of at least one of: a machine-readable symbol element, a start pattern, or a stop pattern.

5. The method of claim 1 wherein extracting classification features from the distorted image signals in the first transform space comprises extracting a set of spectral coefficients.

6. The method of claim 1 wherein transforming the plurality of distorted image signals from a signal space into a first transform space comprises performing a discrete cosine transform (DCT) on the distorted image signals, and extracting classification features from the distorted image signals in the first transform space comprises extracting a number of DCT coefficients obtained by performing the DCT on the distorted image signals.

7. The method of claim 1 wherein generating a distortion model for the training images comprises generating a distortion model that accounts for at least one of: optical blur, ink spread, quantization shift, luminance variation, or sensor noise.

8. The method of claim 1 wherein transforming the plurality of distorted image signals from a signal space into a first transform space comprises performing a transform that is robust to a low pass centrosymmetric filter.

9. The method of claim 8 wherein performing a transform that is robust to a low pass centrosymmetric filter comprises performing a Discrete Sine Transform, a Discrete Cosine Transform, a Chebyshev Transform, or a Lagrange Transform.

10. The method of claim 1 wherein extracting classification features from the distorted image signals in the first transform space comprises extracting a number of transform coefficients obtained by performing the transform on the distorted image signals.

11. The method of claim 1 wherein training a first machine-readable symbol classifier based at least in part on the extracted classification features comprises training at least one of a random decision forest classifier or a Mahalanobis classifier.

12. The method of claim 1 wherein receiving a plurality of training images comprises receiving a plurality of training images, each training image corresponding to a one-dimensional machine-readable symbol or a two-dimensional machine-readable symbol.

13. The method of claim 1 wherein determining a quality measure for the first and the second machine-readable symbol classifiers comprises determining a measure of blur invariance for the first and the second machine-readable symbol classifiers.

14. An image processor system, comprising:

at least one processor;

at least one nontransitory processor-readable storage medium operatively coupled to the at least one processor and storing at least one of data or instructions which, when executed by the at least one processor, cause the at least one processor to:

receive a plurality of training images, each of the plurality of training images corresponds to one of a plurality of machine-readable symbols;

generate a distortion model for the training images;

generate a plurality of distorted image signals based at least in part on the distortion model and the training images, each of the plurality of distorted image signals corresponds to one of the machine-readable symbols;

transform the plurality of distorted image signals from a signal space into a first transform space;

extract classification features from the transformed distorted image signals in the first transform space;

train a first machine-readable symbol classifier based at least in part on the extracted classification features;

determine a quality measure for the first machine-readable symbol classifier;

transform the plurality of distorted image signals from a signal space into a second transform space;

extract classification features from the distorted image signals in the second transform space;

train a second machine-readable symbol classifier based at least in part on the extracted classification features;

determine a quality measure for the second machine-readable symbol classifier; and select one of the first machine-readable symbol classifier or the second machine-readable symbol classifier based at least in part on the determined quality measure.

15. The image processor system of claim 14 wherein the at least one processor:

receives an run-time image in the at least one nontransitory processor-readable storage medium;

transforms image signals of the received run-time image from a signal space into the first transform space;

extracts classification features from the transformed image signals in the transform space; and classifies the run-time image using the trained first machine-readable symbol classifier using the extracted classification features.

16. The image processor system of claim 15 wherein the at least one processor:

determines a location of the received run-time image that includes a machine-readable symbol; and determines a distortion effect of an object adjacent the location of the received run-time image that includes machine-readable symbol, wherein the processor accounts for the determined distortion effect during classification of the received run-time image.

17. The image processor system of claim 16 wherein the at least one processor:

determines the distortion effect of at least one of: a machine-readable symbol element, a start pattern, or a stop pattern.

18. The image processor system of claim 14 wherein the at least one processor:

extracts a set of spectral coefficients as the classification features.

19. The image processor system of claim 14 wherein the at least one processor:

performs a discrete cosine transform (DCT) on the distorted image signals, and extracts a number of DCT coefficients obtained by the performance of the DCT on the distorted image signals.

20. The image processor system of claim 14 wherein the at least one processor:

generates a distortion model that accounts for at least one of: optical blur, ink spread, quantization shift, luminance variation, or sensor noise.

21. The image processor system of claim 14 wherein the at least one processor:

performs a transform that is robust to a low pass centrosymmetric filter.

22. The image processor system of claim 21 wherein the at least one processor:

performs a Discrete Sine Transform, a Discrete Cosine Transform, a Chebyshev Transform, or a Lagrange Transform.

23. The image processor system of claim 14 wherein the at least one processor:

extracts a number of transform coefficients obtained by performing the transform on the distorted image signals.

24. The image processor system of claim 14 wherein the at least one processor:

trains at least one of a random decision forest classifier or a Mahalanobis classifier.

25. The image processor system of claim 14 wherein each training image corresponds to a one-dimensional machine-readable symbol or a two-dimensional machine-readable symbol.

26. The image processor system of claim 14 wherein the at least one processor:

determines a measure of blur invariance for the first and the second machine-readable symbol classifiers.

* * * * *